(No Model.)
W. E. ULMER.
ELECTRICAL FOOT WARMER.
No. 492,247. Patented Feb. 21, 1893.
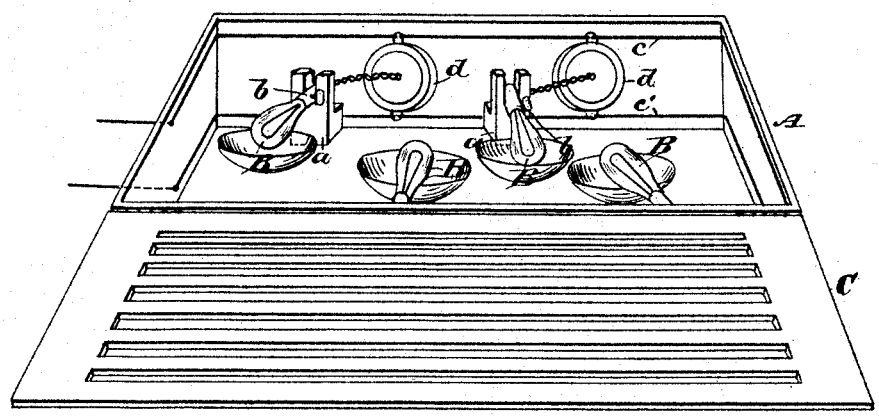
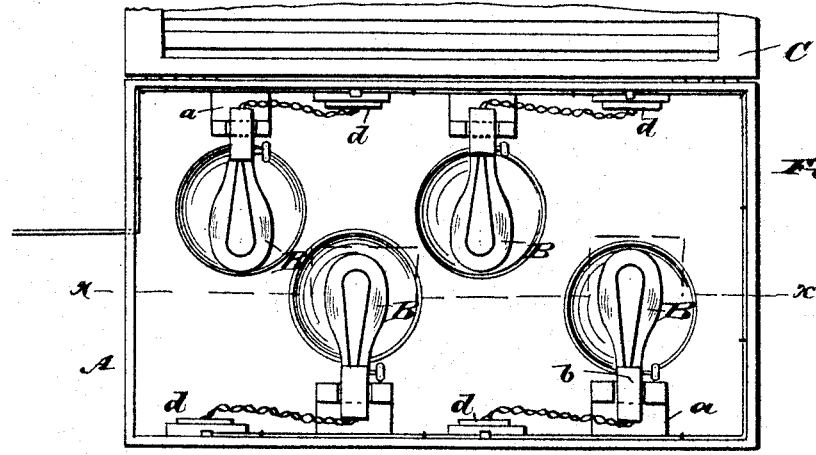
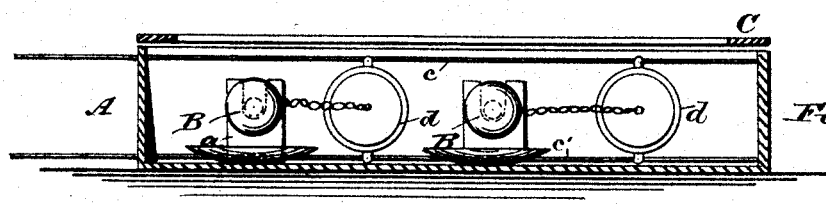
WITNESSES:
F. McArdle.
C. Sedgwick
INVENTOR:
W. E. Ulmer
BY Munn & Co.
ATTORNEYS.

United States Patent Office.

WILLIAM EUGENE ULMER, OF HOQUIAM, WASHINGTON.

ELECTRICAL FOOT-WARMER.

SPECIFICATION forming part of Letters Patent No. 492,247, dated February 21, 1893.

Application filed April 27, 1892. Serial No. 430,880. (No model.)

*To all whom it may concern:*

Be it known that I, WILLIAM EUGENE ULMER, of Hoquiam, in the county of Chehalis and State of Washington, have invented a new and Improved Electrical Foot-Warmer, of which the following is a specification, reference being had to the annexed drawings, forming a part thereof, in which—

Figure 1 is a perspective view of my improved electrical foot warmer; Fig. 2 is a plan view; and Fig. 3 is a vertical longitudinal section taken on line $x-x$ in Fig. 2.

Similar letters of reference indicate corresponding parts in all the views.

The object of my invention is to provide a simple electric foot warmer, in which ordinary incandescent electric lamps are used as a source of heat.

The invention consists in the combination with a box or receptacle provided with holders for receiving and holding the electric lamps, and furnished with a slotted or apertured cover for the escape of heat, of one or more electric lamps placed in the box and held in the position of use by the holders, all as will be hereinafter more fully described.

The box A, of suitable size and shape to contain the required number of incandescent electric lamps, is provided with a series of standards $a$ attached to the bottom of the box, and slotted to receive the sockets $b$ of the incandescent electric lamps B. The interior of the box is furnished with a pair of wires $c$, $c'$, which extend around the inner surface of the sides of the box, and are connected with cutouts $d$, attached to the sides of the box. The said cut-outs are connected by double flexible cords with the lamps B. The wires $c$, $c'$, are connected by a flexible cord with conductors extending to any suitable source of electricity.

The cover C, which is hinged to the box, in the present case is slotted longitudinally to allow the heated air to escape from the box. The amount of heat generated in the box is controlled by turning the lamps B, on or off as occasion may require.

Under each lamp, I place a concave reflector to project the heat all in one direction.

In addition to its use as a foot warmer, my improved device may be employed for warming a bath room, bedroom or conservatory.

My improved foot warmer is designed to be used wherever a small area is to be heated, or where a small amount of heat is required locally.

Having thus described my invention, I claim as new and desire to secure by Letters Patent—

1. An electric foot warmer, comprising a box provided with a hinged cover having openings therein, slotted standards projecting from the bottom of the box, electric lamps held in the said slotted standards, and electric wires leading from the box, substantially as set forth.

2. An electric foot warmer, consisting of a box provided with a cover having openings therein, slotted standards projecting from the bottom of the box, electric lamps held in the said slotted standards, reflectors under the lamps, cut outs held in the box and connected with the lamps, and electric wires leading from the box and with which the cut outs are connected, substantially as herein shown and described.

WILLIAM EUGENE ULMER.

Witnesses:
H. BARKER,
H. J. STARR.